3,217,585
CAGE NUT
Robert A. Munse, Perrysburg, Ohio, assignor, by mesne assignments, to The Bishop and Babcock Corporation, Toledo, Ohio, a corporation of Ohio
Filed Apr. 19, 1963, Ser. No. 274,082
1 Claim. (Cl. 85—80)

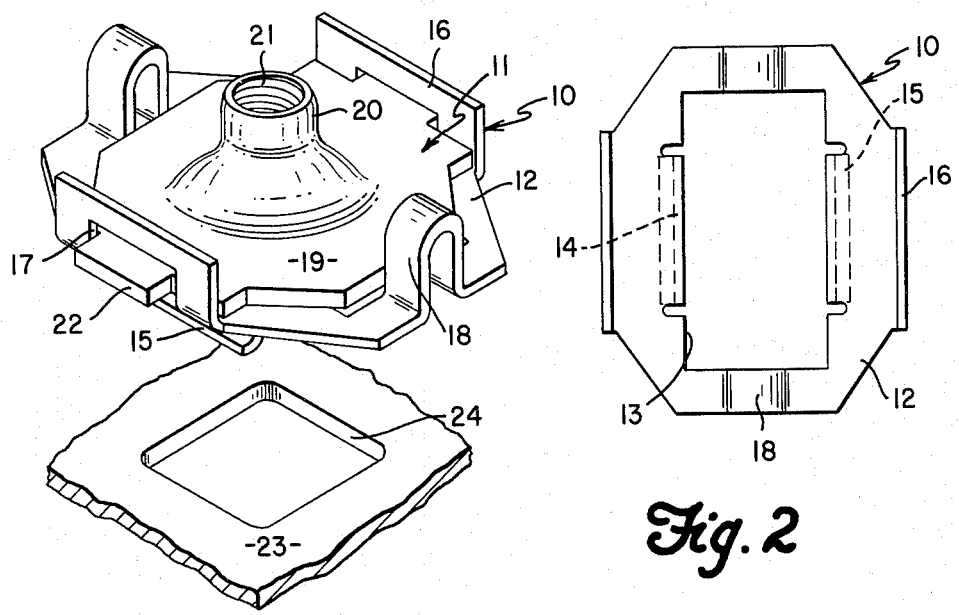
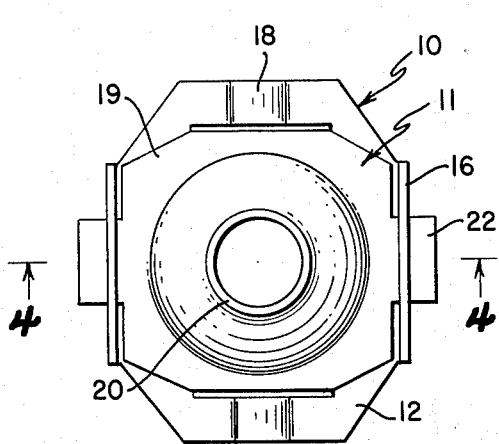
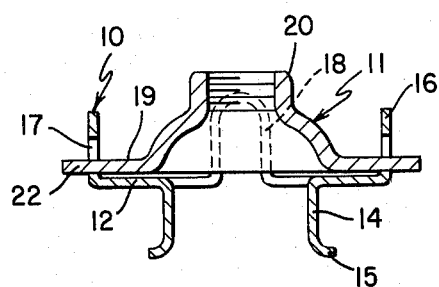

This invention relates to fasteners but more particularly to cage nuts consisting generally of a sheet metal cage member adapted to be mounted on a supporting panel and a nut member separate from but contained by the cage member.

An object is to produce a new and improved cage nut which not only can be produced economically on a quantity production basis but also because of constructional features, resists separation from the panel to which it is attached when forces are applied in a manner which would simulate abuse of the fastener in asembly.

Another object is to produce a cage nut in which the cage member is so formed as to afford a degree of protection to the nut member from damage occasioned by lateral blows directed against it.

Other objects and advantages of the invention will hereinafter appear and, for purposes of illustration but not of limitation, an embodiment of the invention is shown on the accompanying drawings in which FIGURE 1 is a top perspective view on an enlarged scale of the cage nut and showing in perspective a fragment of a supporting panel provided with a rectangular hole for receiving the cage nut;

FIGURE 2 is a top plan view of the cage member with the nut element removed;

FIGURE 3 is a top plan view of the cage nut assembly; and

FIGURE 4 is a vertical sectional elevation substantially on the line 4—4 of FIGURE 3.

The illustrated embodiment of the invention comprises a cage nut constituting an assembly of a spring metal cage 10 and a nut member 11. The cage member 10 is of relatively thin sheet metal having appreciable resiliency or springiness and comprises a generally rectangular flat body 12 formed with a central substantially elongate rectangular hole 13. Struck from the body and constituting portions of the metal which previously occupied the hole 13 are downwardly bent hook portions 14 which extend at substantially right angles from the body 12. The extreme end portions of the hook members are bent outwardly in opposite directions as indicated at 15. These hooks are for engagement in a supporting panel, such as indicated at 23, which is formed with a rectangular hole 24. It will be understood that the hooks 14 engage opposite side edges of the hole 24 and are applied by engaging one hook member and then flexing it sufficiently to enable the other hook member to be engaged. The provision for affording such resilient flexibility will be hereinafter described.

Adjacent each of the hook members 14, the side edge portions of the body on opposite sides are bent upwardly at substantially right angles to form parallel upstanding flanges 16. The flanges 16 are of rectangular form and each is provided with a longitudinally elongate rectangular hole 17. The lower edge of each hole 17 is substantially at the juncture of the respective flange and the body 12.

Disposed in a plane at right angles to the plane of the flanges 16 are upwardly curved arch portions 18 which are disposed centrally of the respective sides of the body and project upwardly to a height equal to or greater than that of the flanges 16. It will be observed that the arch portions 18 are open arches and they function as spring elements or reservoirs to afford resilient flexing of the hooks 14 to enable them to engage in the supporting panel aperture and also to insure that they remain properly in attached position.

The other part of the cage nut assembly consists of a nut member 11 provided with a flat body 19 which bears flatly against the upper face of the cage body 12. Formed centrally of the nut body 19 is an upwardly extruded sleeve portion 20 formed with internal screw threads 21. As shown on FIGURE 4 the screw-threaded portion of the nut member is accessible at the bottom due to the hole 13 in the cage to admit a bolt or screw member.

The nut body 19 is formed on two sides with oppositely projecting flat rectangular extensions 22 which loosely fit the holes 17 and the flanges 16, thereby to afford limited floating action of the nut member. It will be understood that other forms of nut members may be used to advantage and the extruded form herein shown and described is given merely by way of illustration.

From the above description it is manifest that I have produced an exceedingly simple and inexpensive cage nut assembly, the parts of which can be economically produced on a quantity basis and assembled in a simple manner. The assembly is so formed that separation from the supporting panel is effectively resisted when forces are applied in a manner which would simulate abuse to the fastener in assembly. The upstanding, oppositely disposed spring arches 18 and the upstanding flanges 16 contain the nut member so as to resist to a large degree lateral forces which might otherwise impinge against the nut member and damage it. The simplicity of the assembly and its ease of assembly on a supporting panel are features which contribute admirably to a fastener of this character.

Numerous changes in details of construction, arrangement and operation may be effected without departing from the spirit of the invention, especially as defined in the appended claim.

What I claim is:

A cage nut comprising:
  a cage member of spring sheet metal having a pair of flat oppositely disposed portions which cooperate to provide a generally rectangular flat body provided with a central aperture;
  a pair of laterally spaced parallel panel attaching hooks struck from an interior portion of said body and extending downwardly from the edges of the central aperture and facing in opposite directions;
  a pair of oppositely disposed parallel upwardly extending apertured flanges on opposite outer sides of said pair of flat portions of said body arranged above and in generally parallel outwardly spaced relation to said hooks respectively;
  a pair of upwardly extending arched spring elements integral with the other sides of said pair of flat portions of said body respectively interconnecting said portions and affording resilient flexing of said flat portions of said body and said hooks for application to a panel aperture; and a nut member containing thread means integral therewith, said nut member including a flat plate-like body having a pair of flat oppositely projecting extensions inserted respectively through the apertures in said upwardly extending apertured flanges, portions of the nut on each side of the extensions respectively being adapted to abut against said flanges, other side portions of said nut member being disposed between and adjacent to said arched spring elements, whereby said flanges and said arched spring elements contain said nut member therebetween and restrict its lateral shifting movement.

References Cited by the Examiner

UNITED STATES PATENTS

| | | | |
|---|---|---|---|
| 2,390,752 | 12/1945 | Tinnerman | 151—41.80 |
| 2,455,145 | 11/1948 | Swanstrom | 151—41.76 |
| 2,585,728 | 2/1952 | Bedford | 151—41.75 |
| 2,668,998 | 2/1954 | Tinnerman | 151—41.80 |
| 2,967,556 | 1/1961 | Jaworski | 151—41.80 |

EDWARD C. ALLEN, *Primary Examiner.*